United States Patent
Nomura et al.

(10) Patent No.: US 8,508,816 B2
(45) Date of Patent: Aug. 13, 2013

(54) IMAGE READING APPARATUS

(75) Inventors: Yoshifumi Nomura, Ishikawa (JP);
Motoharu Ichida, Ishikawa (JP)

(73) Assignee: PFU Limited, Ishikawa (JP)

( * ) Notice: Subject to any disclaimer, the term of this patent is extended or adjusted under 35 U.S.C. 154(b) by 801 days.

(21) Appl. No.: 12/633,343

(22) Filed: Dec. 8, 2009

(65) Prior Publication Data

US 2010/0231992 A1    Sep. 16, 2010

(30) Foreign Application Priority Data

Mar. 13, 2009 (JP) ................................. 2009-062059

(51) Int. Cl.
*H04N 1/04* (2006.01)

(52) U.S. Cl.
USPC ............ 358/498; 358/474; 358/471; 358/496

(58) Field of Classification Search
USPC ................. 358/496, 498, 474, 471, 400, 401, 358/500; 399/34, 358
See application file for complete search history.

(56) References Cited

U.S. PATENT DOCUMENTS

| | | | |
|---|---|---|---|
| 6,862,115 B1 * | 3/2005 | Kondo ........................... | 358/474 |
| 7,172,195 B2 * | 2/2007 | Sano et al. .................... | 271/262 |
| 7,634,205 B2 * | 12/2009 | Jen .................................. | 399/34 |
| 7,646,515 B2 * | 1/2010 | Ichinose ....................... | 358/496 |
| 2006/0029446 A1 * | 2/2006 | Shyu .............................. | 399/390 |
| 2011/0102865 A1 * | 5/2011 | Ishida et al. .................. | 358/498 |

FOREIGN PATENT DOCUMENTS

| | | | |
|---|---|---|---|
| JP | 58104563 A | * | 6/1983 |
| JP | 07-210049 A | | 8/1995 |
| JP | 11-139609 A | | 5/1999 |
| JP | 2002-237926 A | | 8/2002 |
| JP | 2003-276893 | | 10/2003 |
| JP | 2005-255324 | | 9/2005 |
| JP | 2005-343668 A | | 12/2005 |

OTHER PUBLICATIONS

Japanese Office Action for Application No. 2009-062059 mailed Oct. 30, 2012.
Decision of Refusal in Japanese Patent application 2009-062059, dated Jun. 4, 2013. (w/English translation).

* cited by examiner

*Primary Examiner* — Cheukfan Lee
(74) *Attorney, Agent, or Firm* — Lowe, Hauptman, Ham & Berner, LLP

(57) ABSTRACT

An image reading apparatus includes: a conveying roller that comes in contact with a sheet medium and causes a conveying force to convey the sheet medium in a conveying direction to act on the sheet medium contacting the conveying roller; an imaging unit that captures an image of the sheet medium that has been conveyed; a guide plate that is provided upstream of the imaging unit in the conveying direction, forms a part of a conveying path through which the sheet medium is conveyed, and includes a plurality of slits along a main-scanning direction perpendicular to the conveying direction; and a charging member that is chargeable, provided upstream of the imaging unit in the conveying direction, arranged separate, via the plurality of slits, from the sheet medium that is being conveyed, and charged at least when the sheet medium is being conveyed by the conveying roller.

11 Claims, 2 Drawing Sheets

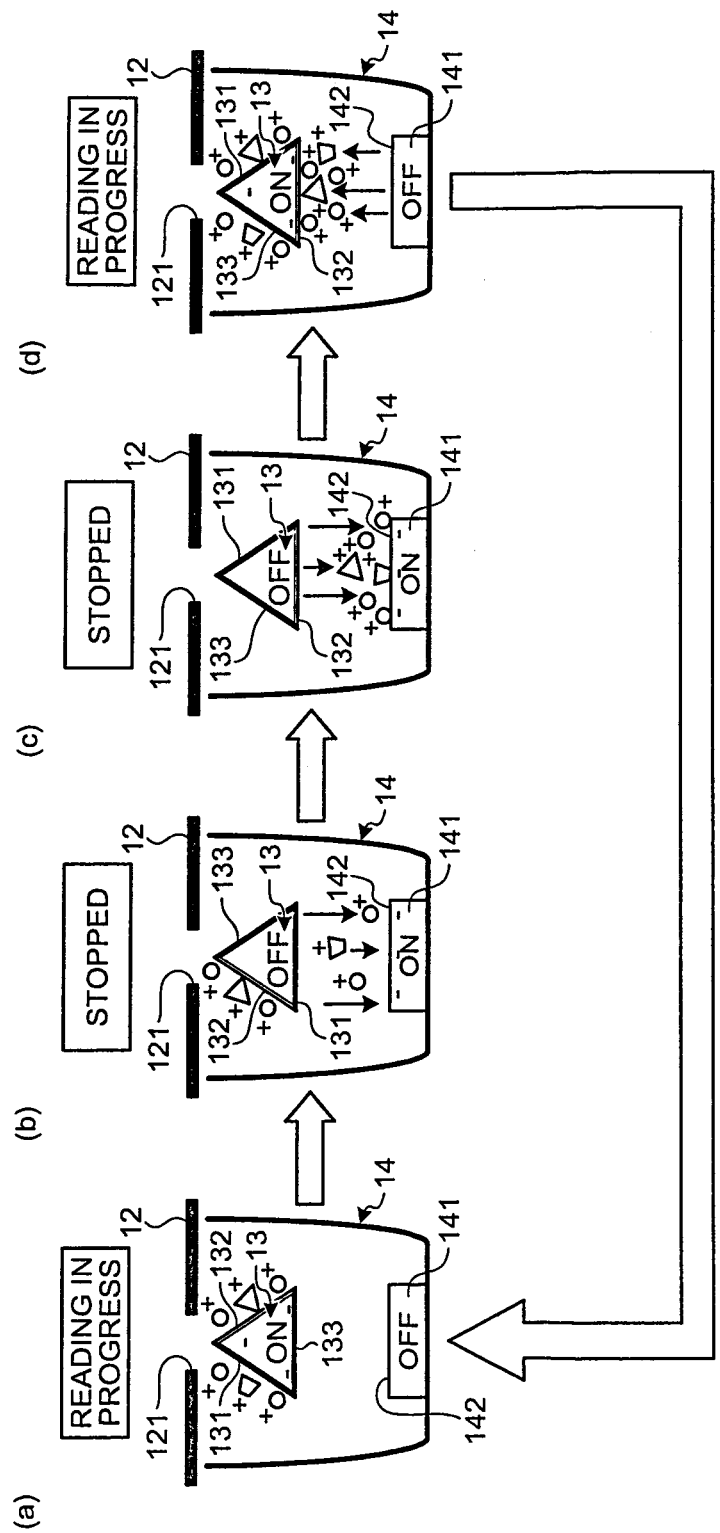

IMAGE READING APPARATUS

CROSS-REFERENCE TO RELATED APPLICATIONS

This application is based upon and claims the benefit of priority from Japanese Patent Application No. 2009-062059, filed Mar. 13, 2009, the entire contents of which are incorporated herein by reference.

BACKGROUND OF THE INVENTION

1. Field of the Invention

The present invention relates to an image reading apparatus that captures an image from a sheet medium while conveying the medium.

2. Description of the Related Art

An example of an image reading apparatus is disclosed in Japanese Patent Application Laid-open No. 2005-343668, which captures an image-recorded surface of a conveyed sheet medium with an image recorded thereon while conveying the sheet medium.

The image reading apparatus disclosed in Japanese Patent Application Laid-open No. 2005-343668 has a charger that is exposed to a conveying path through which the sheet medium is conveyed, and that is located more upstream in a conveying direction than an imaging position at which an image capturing means captures the image from the image-recorded surface of the medium being conveyed. When charged, the charger attracts foreign matter such as paper powder or dust present on the conveying path by an electrically attractive force. Therefore, the foreign matter such as paper powder or dust present on the conveying path is removed at a position upstream of the imaging position in the conveying direction. Thus, it is possible to prevent the foreign matter such as paper powder or dust from being stuck onto the image capturing means.

However, in the image reading apparatus disclosed in Japanese Patent Application Laid-open No. 2005-343668, because the charger is exposed to the conveying path, if the charger contacts the sheet medium after the foreign matter such as paper powder or dust present on the conveying path has been adhered to the charger, the adhered foreign matter such as paper powder or dust may be scattered off from the charging member.

SUMMARY OF THE INVENTION

According to an aspect of the invention, an image reading apparatus includes: a conveying roller that comes in contact with a sheet medium and causes a conveying force to convey the sheet medium in a conveying direction to act on the sheet medium contacting the conveying roller; an imaging unit that captures an image of the sheet medium that has been conveyed; a guide plate that is provided upstream of the imaging unit in the conveying direction, forms a part of a conveying path through which the sheet medium is conveyed, and includes a plurality of slits along a main-scanning direction perpendicular to the conveying direction; and a charging member that is chargeable, provided upstream of the imaging unit in the conveying direction, arranged separate, via the plurality of slits, from the sheet medium that is being conveyed, and charged at least when the sheet medium is being conveyed by the conveying roller.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic side view illustrating operations of main components of the image reading apparatus.

DETAILED DESCRIPTION OF THE PREFERRED EMBODIMENTS

Exemplary embodiments of an image reading apparatus according to the present invention are explained in detail below with reference to the accompanying drawings. The present invention is not limited by the following embodiments.

Figure 1:
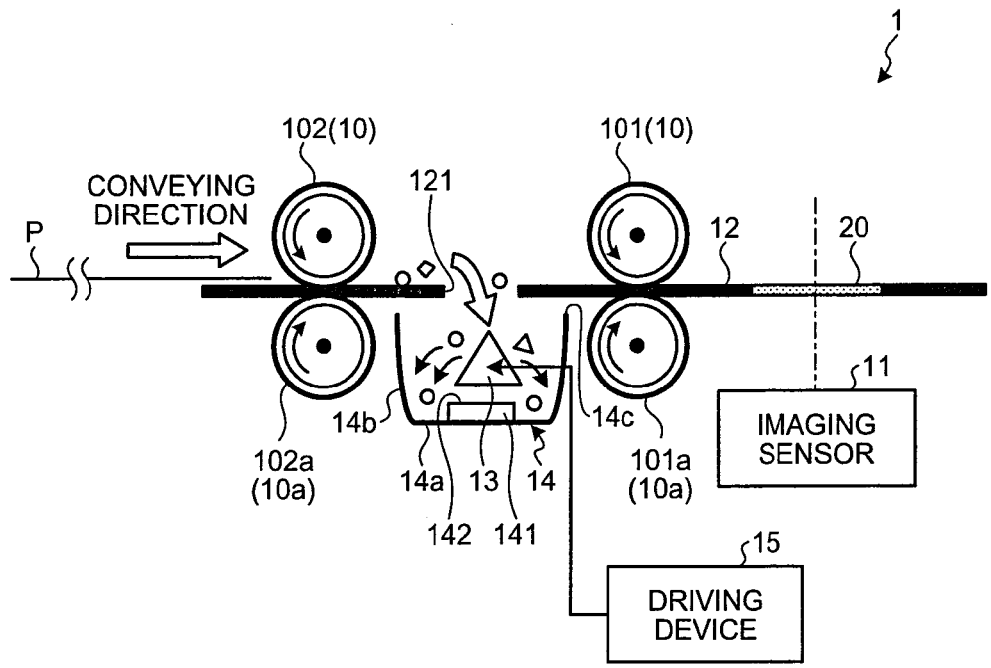
FIG. 1 is a schematic side view of an image reading apparatus according to an embodiment of the present invention.
Figure 2:
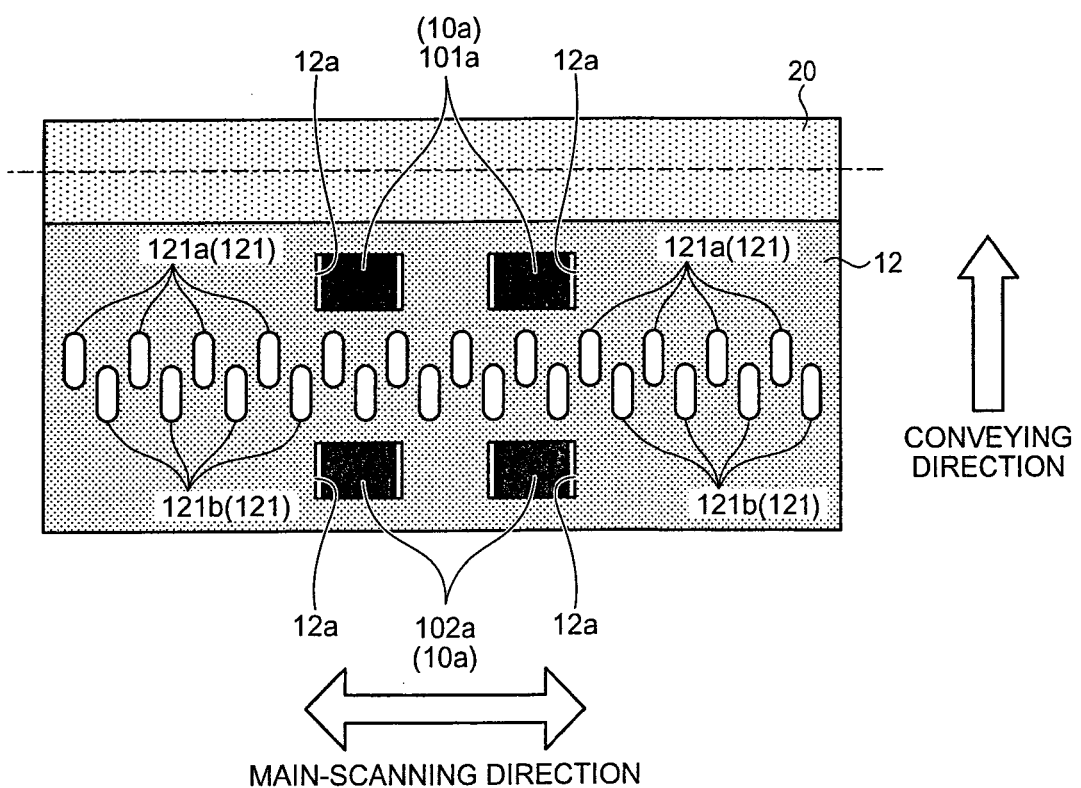
FIG. 2 is a schematic top view of the image reading apparatus.

An image reading apparatus according to an embodiment of the present invention is described below. FIG. 1 is a schematic side view of the image reading apparatus according to the embodiment. FIG. 2 is a schematic top view of the image reading apparatus. FIG. 3 is a schematic side view illustrating operations of main components of the image reading apparatus. An image reading apparatus 1 conveys a sheet medium P and captures an image from the sheet medium P being conveyed. The sheet medium P will be simply referred to as the medium P below. The image reading apparatus 1 includes conveying rollers 10, an imaging sensor 11, a guide plate 12, a charging member 13, a dust collection box 14, and a driving device 15.

The conveying roller 10 conveys the medium P. In the embodiment, a plurality of conveying rollers 10, for example, two conveying rollers 10 are arranged in series in a conveying direction in which the medium P is conveyed. A rotation axis of each conveying roller 10 is located, for example, above a conveying path through which the medium P is conveyed. In other words, each conveying roller 10 is arranged such that the conveying roller 10 contacts only one side of the medium P. Each conveying roller 10 is rotatably supported about its rotation axis. In the embodiment, each conveying roller 10 is supported by a housing of the image reading apparatus 1. In the embodiment, each conveying roller 10 is arranged such that at least a peripheral portion of the conveying roller 10 protrudes toward the conveying path. In the embodiment, one of the two conveying rollers 10, which is downstream in the conveying direction, is referred to as a conveying roller 101 and the other one of the two conveying rollers 10, which is upstream in the conveying direction, is referred to as a conveying roller 102, as necessary.

The conveying rollers 10 are rotated by a driving system not illustrated. The driving system includes, for example, a driving motor and a driving-force transmitting unit. Examples of the driving motor include a stepping motor. The driving motor is driven by electric power from a control device not illustrated. For example, the driving motor is driven by a pulse signal from the control device. Therefore, the driving motor is able to rotate the conveying rollers 10 (counterclockwise in FIG. 1) via the driving-force transmitting unit.

Each conveying roller 10 forms a roller pair with a driven roller 10a. Each driven roller 10a is arranged opposite the conveying roller 10 constituting the same roller pair with the conveying path in-between. Each driven roller 10a is arranged so that it is able to contact the conveying roller 10 constituting the same roller pair. In the embodiment, a plurality of driven rollers 10a, for example, two driven rollers 10a are provided in the image reading apparatus 1. Each driven roller 10a is rotatably supported about its rotation axis and supported such that the driven roller 10a is pressed against a surface of the medium P when the medium P has been conveyed down to between the driven roller 10a and the opposite conveying roller 10. In the embodiment, each driven roller 10a is supported by the not-illustrated housing of the image reading apparatus 1. A peripheral surface of each driven roller 10a contacts a peripheral surface of the opposite conveying roller 10 when the medium P is not between the driven roller 10a and the opposite conveying roller 10.

That is, each conveying roller 10 contacts with the medium P that has been conveyed down to between the conveying roller 10 and the opposite driven roller 10a and is rotated by the not-illustrated driving system, such that a conveying force for conveyance in the conveying direction acts on the medium P in contact with the conveying roller 10. Thus, each conveying roller 10 conveys the medium P in contact with the conveying roller 10 in the conveying direction. In the embodiment, one of the two driven rollers 10a downstream in the conveying direction is referred to as a driven roller 101a and the other one of the two driven rollers 10a upstream in the conveying direction is referred to as a driven roller 102a, as necessary. In other words, the driven roller 101a is the driven roller 10a that constitutes a roller pair with the conveying roller 101, and the driven roller 102a is the driven roller 10a that constitutes a roller pair with the conveying roller 102.

Upstream the plurality of conveying rollers 10 in the conveying direction, a pickup roller, a separator roller, and a brake roller, which are not illustrated, are arranged. More specifically, the pickup roller, the separator roller, the brake roller, and the plurality of conveying rollers 10 are sequentially arranged in this order along the conveying direction. The pickup roller contacts the medium P stacked on a not-illustrated paper feeding tray of the image reading apparatus 1 and rotates, to transfer the medium P in contact with the pickup roller in the conveying direction from the paper feeding tray. The separator roller transfers the medium P that has been transferred from the paper feeding tray by the pickup roller in the conveying direction. The medium P that has been transferred by the separator roller is conveyed down to between the conveying roller 10 and the driven roller 10a, that is, in the embodiment, between the conveying roller 102 and the driven roller 102a. The brake roller is arranged opposite the separator roller with the conveying path in-between. When a plurality of media P are conveyed down to between the separator roller and the brake roller, the brake roller separates, from one of the media P which is to be transferred and is in contact with the separator roller, one of the media P which is to be separated and has been conveyed by the pickup roller in the conveying direction together with the medium P to be transferred. The pickup roller and the separator roller are driven by a driving system not illustrated.

A distance to be provided between these rollers adjacent to each other in the conveying direction, i.e., a distance between the pickup roller, the separator roller, and the plurality of conveying rollers 10 may be any distance that allows a leading edge of the medium P conveyed by an upstream one of the adjacent rollers in the conveying direction to infallibly reach a downstream one of the adjacent rollers in the conveying direction. That is, a distance that allows the adjacent rollers to infallibly transfer and receive the medium P to and from each other is applicable.

The imaging sensor 11 is means for capturing an image. The imaging sensor 11 captures an image from the medium P conveyed by the conveying rollers 10. In the embodiment, the imaging sensor 11 is located more downstream in the conveying direction than the downstream one of the two conveying rollers 10, i.e., the conveying roller 101. In the embodiment, the imaging sensor 11 is located on the same side as the driven rollers 10a with respect to the conveying path. The imaging sensor 11 is arranged opposite a colorless and transparent image-read support plate 20 that constitutes a part of the conveying path together with the guide plate 12, which will be described later.

The imaging sensor 11 is formed of, for example, a plurality of charge coupled device (CCD) imaging devices. Alternatively, the imaging sensor 11 may be formed of, for example, a plurality of CMOS imaging devices. The imaging sensor 11 constitutes an imaging unit together with a light source and the like not illustrated and located on the same side as the imaging sensor 11 with respect to the image-read support plate 20. The light source emits linear light in a main-scanning direction. A plurality of the imaging devices that constitute the imaging sensor 11 is arranged linearly in the main-scanning direction. The imaging sensor 11 scans the entire area of the medium P while the light source is lighting and the medium P is being conveyed by the conveying roller 101 in the conveying direction. Therefore, when the medium P is being conveyed in the conveying direction by the conveying roller 101, i.e., when the imaging sensor 11 is reading the medium P, light emitted from the light source and reflected by the medium P, i.e., reflected light, enters each of the imaging devices of the imaging sensor 11, so that each of the imaging devices of the imaging sensor 11 outputs a captured image signal per exposure corresponding to the entire area of the medium P. The captured image signal is transmitted to, for example, an image-data generating apparatus connected to the image reading apparatus 1. The image-data generating apparatus performs predetermined image processing on the captured image signal transmitted from the imaging sensor 11, and generates captured image data corresponding to the entire area of the medium P. As described above, the imaging sensor 11 captures an image from the medium P based on, for example, the linear light from the light source and reflected by the medium P that is being conveyed in the conveying direction by the conveying roller 101.

The guide plate 12 constitutes a part of the conveying path. The guide plate 12 is located upstream of the imaging sensor 11 in the conveying direction. In the embodiment, the guide plate 12 is arranged to bridge between the driven roller 101a and the driven roller 102a in the conveying direction and arranged continuously with the image-read support plate 20 in the conveying direction. The guide plate 12 is, for example, a rectangular plate. When the guide plate 12 contacts the medium P that is being conveyed by the conveying rollers 10, the guide plate 12 guides the medium P downstream in the conveying direction. In the embodiment, when the guide plate 12 contacts the medium P that is being conveyed by the conveying roller 102, the guide plate 12 guides the medium P towards the conveying roller 101, and, when the guide plate 12 contacts the medium P that is being conveyed by the conveying roller 101, the guide plate 12 guides the medium P towards the imaging sensor 11. Openings 12a for exposing the driven rollers 101a and 102a toward the conveying path are formed on the guide plate 12. When the medium P is not being conveyed, i.e., when reading of the medium P by the imaging sensor 11 is being stopped, the conveying roller 101 and the driven roller 101a are in contact with each other via the opening 12a, and the conveying roller 102 and the driven roller 102a are in contact with each other via the opening 12a.

A plurality of slits 121, i.e., slits 121a and 121b, are formed on the guide plate 12 along the main-scanning direction perpendicular to the conveying direction. In the embodiment, the plurality of slits 121 are formed between the opening 12a corresponding to the driven roller 101a and the opening 12a corresponding to the driven roller 102a on the guide plate 12 in the conveying direction. In the embodiment, a plurality of the slits 121a and a plurality of the slits 121b are formed on the guide plate 12. In the embodiment, the slits 121 are formed such that the slits 121a and 121b are alternately arranged along the main-scanning direction. In the embodiment, a distance between two slits 121 adjacent to each other in the main-scanning direction, i.e., the slits 121a and 121b, is uniform. In other words, the slits 121 are arranged at regular intervals in the main-scanning direction. Here, the slits 121a and 121b, i.e., two slits 121 adjacent to each other in the main-scanning direction, are located at positions shifted from each other in the conveying direction. In the embodiment, the slit 121a is located more downstream in the conveying direction than the slit 121b.

Each of the slits 121a and 121b is, for example, a long hole extending in the conveying direction. In the embodiment, the slits 121a and 121b, i.e., the two slits 121 adjacent to each other in the main-scanning direction, are arranged such that the slits 121a and 121b partially overlap each other when viewed in the main-scanning direction.

If all of the slits 121 are disposed at the same position in the conveying direction, the slits 121 become too close to each other in the main-scanning direction. Consequently, the medium P being conveyed by the conveying roller 102 gets caught by the slits 121 and performance of conveying the medium P is degraded. In contrast, in the image reading apparatus 1, the two slits 121a and 121b adjacent to each other in the main-scanning direction are positionally shifted from each other in the conveying direction, and thus the slits 121 positioned equally in the conveying direction do not become too close to each other in the main-scanning direction. Therefore, the image reading apparatus 1 is able to prevent the medium P being conveyed by the conveying roller 102 from getting caught by the slit 121, i.e., the slit 121a or the slit 121b.

The charging member 13 attracts foreign matter, such as paper powder or dust, which is present on the conveying path. The charging member 13 is located more upstream than the imaging sensor 11 in the conveying direction. In the embodiment, the charging member 13 is arranged between the driven roller 101a, which is the driven roller 10a located upstream of and closest to the imaging sensor 11, and the driven roller 102a, which is the driven roller 10a located upstream of and closest to the driven roller 101a. The charging member 13 is arranged separate from the medium P being conveyed by the conveying roller 101 or the conveying roller 102, via the slits 121 of the guide plate 12. Namely, the charging member 13 is located more upstream than the imaging sensor 11 in the conveying direction and is arranged separate from the medium being conveyed by the conveying roller 101 or the conveying roller 102, via the slits 121 of the guide plate 12. That is, the charging member 13 is located upstream of the imaging sensor 11 in the conveying direction and indirectly exposed to the conveying path.

The charging member 13 is formed of, for example, a conductor or a dielectric, and is negatively chargeable by being applying with a voltage. The charging member 13 is connected to, for example, a power supply circuit not illustrated, and is charged by a voltage applied from the power supply circuit. The charging member 13 is dischargeable. The charging member 13 is connected to, for example, a discharger, and is discharged by driving the discharger by a control device not illustrated. The charging member 13 may be grounded via, for example, a switch such that the charging member 13 is discharged by closing the switch. The charging member 13 is charged by the voltage applied by the power supply circuit, at least when the medium P is being conveyed by the conveying roller 101 or the conveying roller 102. In the embodiment, the charging member 13 is charged by the voltage applied from the power supply circuit when the medium P is being conveyed by the conveying roller 101 or the conveying roller 102. Furthermore, in the embodiment, when the medium P is not conveyed by the conveying roller 101 or the conveying roller 102, the power supply circuit stops applying the voltage and the discharging is performed by, for example, the discharger. The medium P is positively chargeable.

Furthermore, in the embodiment, the charging member 13 is in the form of an equilateral triangular prism. The charging member 13 is arranged so that its axis is along the main-scanning direction. The axis of the charging member 13 is rotatably supported by the not-illustrated housing of the image reading apparatus 1. Therefore, each of three lateral faces 131, 132, and 133 of the charging member 13, which is a plane extending in the main-scanning direction, is able to face the medium P being conveyed by the conveying roller 101 or the conveying roller 102, via the slits 121 of the guide plate 12. In the embodiment, when the charging member 13 is viewed along the main-scanning direction, the lateral faces 131, 132, and 133 are arranged clockwise in order in FIG. 1, about the axis of the charging member 13.

The dust collection box 14 accumulates foreign matter such as paper powder or dust. The dust collection box 14 is formed of, for example, a bottom wall portion 14a that is a rectangular plate and a side wall portion 14b that is tubular and extending to stand up from an edge of the bottom wall portion 14a. The dust collection box 14 has a lateral cross section that is approximately U-shaped and is in a form of a rectangular box with an opening 14c. The dust collection box 14 is located on the same side as the charging member 13 with respect to the guide plate 12, and accommodates the charging member 13. The dust collection box 14 is located such that the whole plurality of slits 121 of the guide plate 12 are sandwiched by both an upstream end and a downstream end in the conveying direction of the side wall portion 14b forming the opening portion 14c and by both of one end and the other end in the main-scanning direction of the side wall portion 14b forming the opening 14c. In other words, when viewed along a direction in which the dust collection box 14 and the guide plate 12 face each other, the dust collection box 14 is located such that the side wall portion 14b forming the opening 14c surrounds the whole of the plurality of slits 121 of the guide plate 12. Therefore, foreign matter, such as paper powder or dust, that has been accumulated in the dust collection box 14 is not scattered out from the dust collection box 14. The dust collection box 14 is supported by, for example, the not-illustrated housing of the image reading apparatus 1, and is detachable from a mounting position at which the dust collection box 14 accommodates the charging member 13.

The dust collection box 14 has a chargeable attracting member 141 inside the dust collection box 14. More specifically, the attracting member 141 is formed of, for example, a conductor or a dielectric, and is negatively chargeable by being applied with a voltage, similarly to the charging member 13. The attracting member 141 is connected to, for example, a power supply circuit, and is charged by a voltage applied from the power supply circuit. The attracting member 141 is dischargeable. The attracting member 141 is connected to, for example, a discharger, and is discharged when the discharger is driven by a control device, similarly to the charging member 13. The attracting member 141 may be grounded via, for example, a switch and discharging may be performed by closing the switch. The attracting member 141 is mounted on the bottom wall portion 14a inside the dust collection box 14, and arranged separate from the charging member 13 to prevent interference caused by rotation of the charging member 13 about its axis. In the embodiment, when the medium P is to be conveyed by the conveying roller 101 or the conveying roller 102, the power supply circuit stops application of the voltage to the attracting member 141 and the attracting member 141 is discharged by, for example, the discharger. Furthermore, in the embodiment, when the medium P is not to be conveyed by the conveying roller 101 or the conveying roller 102, the attracting member 141 is charged by a voltage applied by the power supply circuit.

The dust collection box 14 also has an adhesive member 142 inside the dust collection box 14. More specifically, the adhesive member 142 is provided inside the dust collection box 14. In the embodiment, the adhesive member 142 is, for example, a film provided on an exposed portion of the attracting member 141, and is integrated with the attracting member 141. Therefore, in the embodiment, it is possible to prevent increase in the size of the means for removing and collecting foreign matter such as paper powder or dust from the charging member 13, i.e., the lateral faces 131, 132, and 133. The adhesive member 142 may be not integrated with the attracting member 141.

The driving device 15 is means for driving. The driving device 15 causes the charging member 13 to rotate. The driving device 15 includes a driving motor not illustrated and a driving-force transmitting unit not illustrated. Examples of the driving motor of the driving device 15 include a stepping motor. The driving motor is connected to the axis of the charging member 13 via the driving-force transmitting unit. The driving motor is driven by an electric power supplied from the control device. For example, the driving motor is driven by a pulse signal supplied from the control device. Therefore, the driving device 15 is able to cause the charging member 13 to rotate about its axis via the driving-force transmitting unit. In the embodiment, the driving device 15 is able to cause the charging member 13 to rotate counterclockwise in FIG. 1.

When conveyance of the medium P by the conveying roller 101 or the conveying roller 102 is stopped, the driving device 15 causes the charging member 13 to rotate, before the charging member 13 is discharged by, for example, the discharger, so that at least a portion of a part of the charging member 13 that is in an attraction region does not face the medium P that has been conveyed by the conveying roller 101 or the conveying roller 102 via the slits 121 of the guide plate 12. The attraction region is a region of the charging member 13, which is opposite to, via the slits 121 of the guide plate 12, the medium P being conveyed by the conveying roller 101 or the conveying roller 102.

In the embodiment, when the medium P is being conveyed by the conveying roller 101 or the conveying roller 102, two of the three lateral faces 131, 132, and 133 of the charging member 13 are located in the attraction region, and the remaining one is located in a non-attraction region that is a region of the charging member 13 not facing, via the slits 121 of the guide plate 12, the medium P being conveyed by the conveying roller 101 or the conveying roller 102. Namely, in the embodiment, when the medium P is being conveyed by the conveying roller 101 or the conveying roller 102, because of the rotation of the charging member 13 by the driving device 15, two lateral faces consecutive in the rotational direction of the charging member 13 of the three lateral faces 131, 132, and 133 face the medium P conveyed by the conveying roller 101 or the conveying roller 102. Furthermore, in the embodiment, when conveyance of the medium P by the conveying roller 101 or the conveying roller 102 is stopped, after the driving device 15 rotates the charging member 13 to move one of the two lateral faces in the attraction region to the non-attraction region, the charging member 13 is discharged by, for example, the discharger, and is rotated by the driving device 15 to move the other one of the two lateral faces which was in the attraction region before the rotation of the charging member 13 to the non-attraction region while the charging member 13 is maintained in the discharged state. Namely, in the embodiment, when the conveyance of the medium P by the conveying roller 101 or the conveying roller 102 is stopped, two lateral faces facing the medium P that has been conveyed by the conveying roller 101 or the conveying roller 102 of the three lateral faces 131, 132, and 133 are rotated in a direction in which the two lateral faces do not face the medium P that has been conveyed by the conveying roller 101 or the conveying roller 102 to move the two lateral faces to face the attracting member 141 one by one in the rotational direction of the charging member 13 while the charging member 13 is in the discharged state and the attracting member 141 is in the charged state.

Next, operations of the image reading apparatus 1 of the present embodiment are described.

In the image reading apparatus 1, when a user presses a scan button not illustrated and provided in the image reading apparatus 1 with the media P stacked on the paper feeding tray, an instruction to start scanning of the medium P is input to the control device, and the control device supplies electric power to the driving motor of the driving system and the like to drive the driving motor, so that the pickup roller, the separator roller, the conveying rollers 10, and the like are rotated. As a result, the medium P placed on the paper feeding tray is conveyed along the conveying direction.

At this time, as illustrated at (a) in FIG. 3, in the image reading apparatus 1, at least when the medium P is being conveyed by the conveying roller 101 or the conveying roller 102, i.e., in the embodiment, when the medium P is being conveyed by the conveying roller 101 or the conveying roller 102, the power supply circuit supplies electric power to the charging member 13 to charge the charging member 13, and thus electrical attraction force acts on foreign matter such as paper powder or dust, which is stuck to the medium P or which is present on the conveying path. Therefore, when conveyed to the slits 121 of the guide plate 12 together with the medium P being conveyed by the conveying roller 101 or the conveying roller 102, the foreign matter, such as paper powder or dust, stuck to the medium P or present on the conveying path passes through the slits 121 and is attracted due to the electrical attraction force to adhere to a portion of the charging member 13 in the attraction region, such as the lateral faces 131 and 132 of the charging member 13. In other words, it is possible to remove the foreign matter such as paper powder or dust from the conveying path by the electrical attraction force. At this time, the lateral faces 131 and 132 of the charging member 13 attract the foreign matter, such as paper powder or dust, stuck to the medium P or present on the conveying path, with the electrical attraction force via the slits 121 of the guide plate 12. Therefore, the lateral faces 131 and 132 allow the foreign body, such as paper powder or dust, stuck to the medium P or present on the conveying path to be attracted and adhered to the lateral faces 131 and 132 without contacting the medium P.

Two slits 121*a* and 121*b* adjacent to each other in the main-scanning direction partially overlap each other when viewed in the main-scanning direction, and thus it is possible to secure a slit assembly region which is large in both the conveying direction and the main-scanning direction. This slit assembly region is a region in which the whole plurality of slits 121 is formed on the guide plate 12. Therefore, it is possible to improve the performance of removing the foreign matter such as paper powder or dust, stuck to the medium P or present on the conveying path, without degrading the performance of conveying the medium P conveyed by the conveying roller 101 or the conveying roller 102.

Next, as illustrated at (b) in FIG. 3, in the embodiment, when conveyance of the medium P by the conveying roller 101 or the conveying roller 102 is stopped, the charging member 13 is rotated by the driving device 15 about its axis such that, the lateral face 131 of the two lateral faces 131 and 132 positioned in the attraction region, faces the attracting member 141 and the lateral face 132 moves to a position where the lateral face 131 has been positioned. Subsequently, the charging member 13 is discharged by, for example, the discharger, and the attracting member 141 is charged by electric power supplied from the power supply circuit. Namely, when conveyance of the medium P by the conveying roller 101 or the conveying roller 102 is stopped, the charging member 13 is rotated by the driving device 15 about its axis such that the lateral face 131 positioned in the attraction region is moved to the non-attraction region to face the attracting member 141, and the charging member 13 is discharged and the attracting member 141 is charged, so that electrical attraction force from the attracting member 141 acts on the foreign matter such as paper powder or dust, adhered to the lateral face 131. As a result, the foreign matter, such as paper powder or dust, adhered to the lateral face 131 moves toward the attracting member 141 due to the electrical attraction force, and thus is adhered to the attracting member 141.

Next, as illustrated at (c) in FIG. 3, while the charging member 13 is maintained in the discharged state by, for example, the discharger, the charging member 13 is rotated by the driving device 15 about its axis such that the lateral face 132 positioned in the attraction region moves to the non-attraction region to face the attracting member 141. At this time, the attracting member 141 stays charged by electric power supplied from the power supply circuit, and thus electrical attraction force from the attracting member 141 acts on the foreign matter, such as paper powder or dust, adhered to the lateral face 132. As a result, the foreign matter, such as paper powder or dust, adhered to the lateral face 132 moves toward the attracting member 141 due to the electrical attraction force, and is adhered to the attracting member 141. Finally, when the rotation of the charging member 13 by the driving device 15 is stopped, the lateral face 132 faces the attracting member 141.

In other words, when conveyance of the medium P by the conveying roller 101 or the conveying roller 102 is stopped, the foreign matter, such as paper powder or dust, is removed by the electrical attraction force from the portion of the charging member 13 in the attraction region, i.e., the lateral faces 131 and 132. Therefore, it is possible to regain the capability of the charging member 13 to cause the paper powder or dust to be attracted and adhered to the charging member 13.

Furthermore, as described above, in the image reading apparatus 1, when conveyance of the medium P by the conveying roller 101 or the conveying roller 102 is stopped, the charging member 13 is rotated by the driving device 15 about its axis before the charging member 13 is discharged by, for example, the discharger, so that at least a portion of the part of the charging member 13 in the attraction region, i.e., the lateral faces 131 and 132, faces the attracting member 141 in the dust collection box 14. Namely, when conveyance of the medium P by the conveying roller 101 or the conveying roller 102 is stopped, at least a portion of the foreign matter, such as paper powder or dust, adhered to the charging member 13, i.e., the foreign matter, such as paper powder or dust, adhered to the lateral faces 131 and 132, is opposite the attracting member 141 in the dust collection box 14, before the charging member 13 is discharged by, for example, the discharger. At this time, in the embodiment, the charging member 13 is discharged by, for example, the discharger after the lateral face 131 has faced the attracting member 141, and thus electrical attraction force does not act on the foreign matter, such as paper powder or dust, adhered to the lateral faces 131 and 132 of the charging member 13. In other words, the charging member 13 is discharged by, for example, the discharger, after at least a portion of the foreign matter, such as paper powder or dust, adhered to the charging member 13, i.e., the foreign matter, such as paper powder or dust, adhered to the lateral face 131, has been disposed to face the attracting member 141 in the dust collection box 14, so that the foreign matter, such as paper powder or dust, adhered to the lateral faces 131 and 132 of the charging member 13 is transferred to the attracting member 141 of the dust collection box 14 due to the electrical attraction force caused by the charging of the attracting member 141. Thus, when conveyance of the medium P by the conveying roller 101 or the conveying roller 102 is stopped, it is possible to remove at least a portion of the foreign matter, such as paper powder or dust, from the charging member 13, i.e., the lateral faces 131 and 132, by the electrical attraction force by the charging of the attracting member 141, and to accumulate the foreign matter, such as paper powder or dust, removed from the lateral faces 131 and 132 of the charging member 13 in the dust collection box 14 by the electrical attraction force due to the charging of the attracting member 141.

In the image reading apparatus 1, the dust collection box 14 accommodates the charging member 13. Therefore, it is possible to collect, in the dust collection box 14, all the foreign matter, such as paper powder or dust, that has been removed from the conveying path via the portion of the charging member 13 that was positioned in the attraction region, i.e., the lateral faces 131 and 132, by the electrical attraction force generated by the charging of the charging member 13. Furthermore, in the image reading apparatus 1, it is possible to even more infallibly hold within the dust collection box 14, by the adhesive member 142 of the dust collection box 14, the foreign matter, such as paper powder or dust, collected by the portion of the charging member 13 in the attraction region, i.e., the lateral faces 131 and 132. In other words, it is possible to improve the capability of holding the foreign matter, such as paper powder or dust, with the adhesiveness of the adhesive member 142.

Next, as illustrated at (d) in FIG. 3, even when the power supply circuit supplies electric power to the charging member 13 to charge the charging member 13 again, the foreign matter, such as paper powder or dust, that has been accumulated in the dust collection box 14 is disposed opposite a portion of the charging member 13, which was in the attraction region before the charging member 13 is discharged by, for example, the discharger and moved by the rotation by the driving device 15 to be not opposite the medium P conveyed by the conveying roller 101 or the conveying roller 102, that is, the lateral face 132 of the charging member 13. In other words, the foreign matter does not face the medium P conveyed by the conveying roller 101 or the conveying roller 102. Therefore, the foreign matter, such as paper powder or dust, which has been accumulated in the dust collection box 14 is not adhered to a portion of the charging member 13, which is newly positioned in the attraction region, i.e., the lateral faces 133 and 131. Namely, when the medium P is conveyed by the conveying roller 101 or the conveying roller 102 again, the portion of the charging member 13, which is newly disposed in the attraction region, i.e., the lateral faces 133 and 131, is put in a state in which the foreign matter, such as paper powder or dust, that has been accumulated in the dust collection box 14 is not adhered to the lateral faces 133 and 131 by the electrical attraction force generated by the charging of the attracting member 141, and thus it is possible to regain the capability of the charging member 13 to cause paper powder or dust to be attracted to and adhered to the charging member 13.

Furthermore, in the image reading apparatus 1, the dust collection box 14 is detachable from the mounting position, so that when the foreign matter, such as paper powder or dust, has accumulated in the dust collection box 14, a user is able to manually detach the dust collection box 14 from the mounting position to discard the foreign matter, such as paper powder or dust, from the dust collection box 14. Moreover, because the dust collection box 14 is detachable from the mounting position, the user is able to manually re-attach the dust collection box 14, from which the foreign matter, such as paper powder or dust, has been discarded, to the mounting position. Therefore, since the user is able to manually detach and attach the dust collection box 14 from and to the mounting position, maintenance of the apparatus is facilitated when the foreign matter, such as paper powder or dust, has accumulated in the dust collection box 14.

While it has been described in the embodiment that the image reading apparatus 1 includes the dust collection box 14, the present invention is not limited to this example. The dust collection box 14 may be omitted.

Furthermore, while it has been described in the embodiment that the dust collection box 14 includes both the attracting member 141 and the adhesive member 142, the present invention is not limited to this example. The dust collection box 14 may include either one of the attracting member 141 and the adhesive member 142. The dust collection box 14 may not include the attracting member 141 and the adhesive member 142. If the dust collection box 14 does not include the attracting member 141 and the adhesive member 142, and when the charging member 13 is discharged, it is possible to drop the foreign matter, such as paper powder or dust, adhered to the charging member 13 to the dust collection box 14 by its self-weight using, for example, the slope with respect to a horizontal plane of a lateral face disposed in the attraction region of the three lateral faces 131, 132, and 133 of the charging member 13.

Furthermore, while it has been described in the embodiment that the image reading apparatus 1 includes the driving device 15, the present invention is not limited to this example. The driving device 15 may be omitted and the charging member 13 may be not rotated.

Moreover, while it has been described in the embodiment that the charging member 13 is in the form of an equilateral triangular prism, the present invention is not limited to this example. The charging member 13 may be cylindrical or platy, such that one surface thereof, i.e., the circumferential surface or the plane, is disposed opposite the medium P conveyed by the conveying roller 101 or the conveying roller 102 via the slits 121 of the guide plate 12.

Furthermore, while it has been described in the embodiment that the dust collection box 14 includes the adhesive member 142, the present invention is not limited to this example. The dust collection box 14 may not have the adhesive member 142 and an adhesive material may be arranged on a portion of the charging member 13 disposed opposite the medium P conveyed by the conveying roller 101 or the conveying roller 102 via the slits 121 of the guide plate 12. Namely, by charging the charging member 13, electrical attraction force may be caused to act on foreign matter, such as paper powder or dust, present on the conveying path, and the adhesive material arranged on the charging member 13 may hold the foreign matter, such as paper powder or dust, that has been attracted toward the charging member 13 from the conveying path.

Moreover, while it has been described in the embodiment that the dust collection box 14 includes the attracting member 141, the present invention is not limited to this example. The dust collection box 14 may not have the attracting member 141, and an attracting member may be disposed separate from the charging member 13 to not face the medium P conveyed by the conveying roller 101 or the conveying roller 102 and to face a portion of the charging member 13 in the non-attraction region.

Furthermore, while it has been described in the embodiment that the plurality of slits 121 which are long holes extending along the conveying direction are arranged on the guide plate 12, the present invention is not limited to this example. For example, a linear slit may be arranged on the guide plate 12 along the main-scanning direction, a string-shaped charging member 13 meandering and extending along the main-scanning direction may be arranged below the slit of the guide plate 12, and the charging member 13 may overlap in a vertical direction with both an upstream end and a downstream end of the guide plate 12 that has been divided by the slit in the conveying direction. As a result, foreign matter, such as paper powder or dust, present on the conveying path may be adhered to the charging member 13 continuously between one end to the other end in the main-scanning direction. The slit provided on the guide plate 12 preferably may be shaped linear thinly along the main-scanning direction. If the slit provided on the guide plate 12 is shaped thinly linear along the main-scanning direction, it is possible to prevent a downstream edge of the medium P conveyed by the conveying roller 101 or the conveying roller 102 from getting stuck on the slit, due to resilience of the medium P.

Moreover, while it has been described in the embodiment that the charging member 13 and the dust collection box 14 are located on the same side as the driven rollers 10a with respect to the guide plate 12, i.e., below the guide plate 12, the present invention is not limited to this example. The charging member 13 and the dust collection box 14 may be located on the same side as the conveying rollers 10 with respect to the guide plate 12, i.e., above the guide plate 12.

Furthermore, while it has been described in the embodiment that the charging member 13 is in the form of an equilateral triangular prism, the present invention is not limited to this example. The charging member 13 may be cylindrical or platy. If the charging member 13 is cylindrical, the charging member 13 may be arranged with its axial direction along the main-scanning direction. If the charging member 13 is platy, the charging member 13 may be arranged such that a portion corresponding to both the center in a plate-thickness direction and the center in the conveying direction is the axis of the charging member 13 and the axial direction of the charging member 13 corresponds to the main-scanning direction, when one of the planes that is an end in the plate-thickness direction corresponds to the attraction region and the other one of the planes that is the other end in the plate-thickness direction corresponds to the non-attraction region. When the charging member 13 is cylindrical or platy, and assuming that the charging member 13 is rotated by 180 degrees by the driving device 15 about its axis upon switchover between reading of the medium P and stopping of the reading, the charging member 13 and the attracting member 141 may be designed to satisfy either one of the following conditions (1) and (2).

(1) When reading of the medium P is started from a state in which the reading of the medium P has been stopped, the charging member 13 is rotated while the charging member 13 is in a discharged state and the attracting member 141 is in a charged state. Subsequently, when the charging member 13 has been charged and the attracting member 141 has been discharged, the reading of the medium P is started.

(2) The attracting member 141 is made of a material more negative than the charging member 13, in terms of the triboelectric series. For example, the attracting member 141 is a metal and the charging member 13 is a resin. The charging member 13 is in the charged state while the medium P is being read, and in the discharged state while reading of the medium P is stopped. The attracting member 141 is continuously in the charged state regardless of whether the reading of the medium P is in progress or the reading of the medium P is stopped.

According to an embodiment of the present invention, when conveyance of a sheet medium by a conveying roller is stopped, a charging member is discharged and an attracting member is charged. Therefore, electrical attraction force acts on foreign matter, such as paper or dust, adhered to the charging member, and the foreign matter, such as paper or dust, adhered to the charging member moves toward the attracting member to be adhered to the attracting member. Namely, when the conveyance of the sheet medium by the conveying roller is stopped, it is possible to remove the foreign matter, such as paper powder or dust, from the charging member, to regain capability of the charging member to attract paper powder or dust and make the foreign matter, such as paper powder or dust, removed from the charging member to be adhered to the attracting member and accumulated in the dust collection box.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
a conveying roller that comes in contact with a sheet medium and causes a conveying force to convey the sheet medium in a conveying direction to act on the sheet medium contacting the conveying roller;
an imaging unit that captures an image of the sheet medium that has been conveyed;
a guide plate that is provided upstream of the imaging unit in the conveying direction, forms a part of a conveying path through which the sheet medium is conveyed, and includes a plurality of slits along a main-scanning direction perpendicular to the conveying direction, the slits being arranged parallel to each other in the conveying direction, the slits that are adjacent to each other in the main-scanning direction being shifted relative to each other in the conveying direction and partially overlapping each other as seen along the main-scanning direction; and
a chargeable charging member that is provided upstream of the imaging unit in the conveying direction, arranged separate, via the plurality of slits, from the sheet medium being conveyed, and charged at least when the sheet medium is being conveyed by the conveying roller.

2. The image reading apparatus according to claim 1, further comprising:
a dust collection box disposed on a same side as the charging member with respect to the guide plate and accommodating the charging member, wherein
the charging member is discharged when the sheet medium is not conveyed by the conveying roller.

3. The image reading apparatus according to claim 2, wherein the dust collection box includes an adhesive member inside the dust collection box.

4. The image reading apparatus according to claim 3, wherein the dust collection box includes
an attracting member inside the dust collection box; and
the adhesive member is provided on an exposed portion of the attracting member to be integrated therewith.

5. The image reading apparatus according to claim 2, wherein:
the dust collection box includes a chargeable attracting member inside the dust collection box; and
the attracting member is discharged when the sheet medium is conveyed by the conveying roller, and is charged when the sheet medium is not conveyed by the conveying roller.

6. The image reading apparatus according to claim 2, wherein the dust collection box is attachable to and detachable from a mounting position at which the dust collection box accommodates the charging member.

7. The image reading apparatus according to claim 1, further comprising:
a driving unit that rotates the charging member, wherein when the conveyance of the sheet medium by the conveying roller is stopped, the driving unit rotates, before the charging member is discharged, the charging member such that at least a portion of a part of the charging member in an attraction region that faces the sheet medium that has been conveyed via the plurality of slits does not face the sheet medium that has been conveyed via the slits.

8. The image reading apparatus according to claim 7, wherein the charging member is in a form of an equilateral triangular prism.

9. The image reading apparatus according to claim 1, wherein the slits are arranged at regular intervals in the main-scanning direction.

10. An image reading apparatus, comprising:
a conveying roller that comes in contact with a sheet medium and causes a conveying force to convey the sheet medium in a conveying direction to act on the sheet medium contacting the conveying roller;
an imaging unit that captures an image of the sheet medium that has been conveyed;
a guide plate that is provided upstream of the imaging unit in the conveying direction, forms a part of a conveying path through which the sheet medium is conveyed, and includes a plurality of slits along a main-scanning direction perpendicular to the conveying direction;
a chargeable charging member provided upstream of the imaging unit in the conveying direction, arranged separate, via the plurality of slits, from the sheet medium being conveyed, and charged at least when the sheet medium is being conveyed by the conveying roller; and a dust collection box disposed on a same side as the charging member with respect to the guide plate and accommodating the charging member, wherein the charging member is discharged when the sheet medium is not conveyed by the conveying roller, the dust collection box includes a chargeable attracting member inside the dust collection box, and the attracting member is discharged when the sheet medium is conveyed by the conveying roller, and is charged when the sheet medium is not conveyed by the conveying roller.

11. An image reading apparatus, comprising:

a conveying roller that comes in contact with a sheet medium and causes a conveying force to convey the sheet medium in a conveying direction to act on the sheet medium contacting the conveying roller;

an imaging unit that captures an image of the sheet medium that has been conveyed;

a guide plate that is provided upstream of the imaging unit in the conveying direction, forms a part of a conveying path through which the sheet medium is conveyed, and includes a plurality of slits along a main-scanning direction perpendicular to the conveying direction; and a chargeable charging member provided upstream of the imaging unit in the conveying direction, arranged separate, via the plurality of slits, from the sheet medium being conveyed, and charged at least when the sheet medium is being conveyed by the conveying roller; and a driving unit that rotates the charging member, wherein when the conveyance of the sheet medium by the conveying roller is stopped, the driving unit rotates, before the charging member is discharged, the charging member such that at least a portion of a part of the charging member in an attraction region that faces the sheet medium that has been conveyed via the plurality of slits does not face the sheet medium that has been conveyed via the slits.

* * * * *